United States Patent
Sivalingam et al.

(10) Patent No.: US 10,818,118 B2
(45) Date of Patent: Oct. 27, 2020

(54) REMOTE APPLICATION FOR CONTROLLING ACCESS

(71) Applicant: Honeywell International Inc., Morris Plains, NJ (US)

(72) Inventors: Prakash Sivalingam, Madurai (IN); Vinoth Dharmalingam, Erode (IN); Rajagopal Govindaraj, Madurai (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/410,557

(22) Filed: May 13, 2019

(65) Prior Publication Data
US 2019/0272688 A1    Sep. 5, 2019

Related U.S. Application Data

(63) Continuation of application No. 15/008,237, filed on Jan. 27, 2016, now Pat. No. 10,339,736.

(51) Int. Cl.
*G07C 9/00* (2020.01)
*G07C 9/25* (2020.01)
(Continued)

(52) U.S. Cl.
CPC ......... *G07C 9/257* (2020.01); *G06F 16/9535* (2019.01); *G07C 9/27* (2020.01);
(Continued)

(58) Field of Classification Search
CPC .............. G07C 9/00087; G07C 9/00103; G07C 9/257; G07C 9/27; G07C 9/26;
(Continued)

(56) References Cited

U.S. PATENT DOCUMENTS

| | | | |
|---|---|---|---|
| 6,270,861 B1 | 8/2001 | Mashburn | |
| 6,720,861 B1 * | 4/2004 | Rodenbeck | G07C 9/00817 340/5.64 |

(Continued)

FOREIGN PATENT DOCUMENTS

| | | |
|---|---|---|
| CN | 104050743 A | 9/2014 |
| CN | 204965547 U | 1/2016 |

(Continued)

OTHER PUBLICATIONS

201714002248, India Examination Report, pp. 5, dated Nov. 25, 2019.

(Continued)

*Primary Examiner* — Thomas D Alunkal
(74) *Attorney, Agent, or Firm* — Seager, Tufte & Wickhem, LLP

(57) ABSTRACT

A dual authentication access control system for controlling access to a secured area is disclosed, wherein a supervisor is allowed to approve access requests by a person wanting to gain access to the secured area from a remote location. In some cases, the person requesting access to the secured area enters his credentials and submits an access request. If the person's credentials are verified, an access approval request is forwarded to a mobile device of a supervisor. If the supervisor elects to approve access, the supervisor enters his credentials via the supervisor's mobile device. If the supervisor's credentials are verified, the person is granted access to the secured area.

6 Claims, 6 Drawing Sheets

(51) Int. Cl.
*G06F 16/9535* (2019.01)
*H04W 12/08* (2009.01)
*H04W 4/021* (2018.01)
*G07C 9/27* (2020.01)
*H04W 12/00* (2009.01)
*G07C 9/26* (2020.01)

(52) U.S. Cl.
CPC ........... *H04W 4/021* (2013.01); *H04W 12/08* (2013.01); *G07C 9/26* (2020.01); *H04W 12/00503* (2019.01)

(58) Field of Classification Search
CPC ... G06F 16/9535; H04W 4/021; H04W 12/08; H04W 12/00503
See application file for complete search history.

(56) References Cited

U.S. PATENT DOCUMENTS

| | | | |
|---|---|---|---|
| 7,219,236 B2 | 5/2007 | Knight | |
| 8,437,740 B2 | 5/2013 | Despain et al. | |
| 8,736,418 B2 | 5/2014 | Bozionek et al. | |
| 9,979,225 B2* | 5/2018 | Bernhard | H02J 7/345 |
| 2002/0099945 A1* | 7/2002 | McLintock | G07C 9/27 713/186 |
| 2004/0168069 A1 | 8/2004 | Knight | |
| 2005/0075116 A1 | 4/2005 | Laird et al. | |
| 2007/0050634 A1* | 3/2007 | Makimoto | H04L 9/3226 713/182 |
| 2007/0298772 A1* | 12/2007 | Owens | G08B 13/19658 455/414.1 |
| 2010/0176919 A1* | 7/2010 | Myers | G07C 9/00571 340/5.73 |
| 2011/0314515 A1 | 12/2011 | Hernoud et al. | |
| 2013/0331027 A1 | 12/2013 | Rose et al. | |
| 2013/0342314 A1* | 12/2013 | Chen | G07C 9/00309 340/5.65 |
| 2014/0123249 A1* | 5/2014 | Davis | G06F 21/44 726/5 |
| 2014/0139318 A1* | 5/2014 | Malpani | G06F 21/32 340/5.82 |
| 2015/0120529 A1* | 4/2015 | Faaborg | G06Q 10/083 705/39 |
| 2015/0242601 A1* | 8/2015 | Griffiths | G06F 21/305 726/5 |
| 2015/0248663 A1* | 9/2015 | Meere | G06Q 20/3274 705/17 |

FOREIGN PATENT DOCUMENTS

| | | |
|---|---|---|
| EP | 2387007 A1 | 11/2011 |
| EP | 2439970 A1 | 11/2012 |

OTHER PUBLICATIONS

CN201710057047.5, First Office Action, pp. 13, dated Aug. 27, 2019.
Honeywell, "Security Systems Group, Access Systems," 66 pages, Apr. 2011.
Siemens, "SiPass Integrated—Flexible and Reliable Access Control," 12 pages, 2014.
European Search Report 14152063.8, pp. 7, dated Jun. 20, 2017.

* cited by examiner

REMOTE APPLICATION FOR CONTROLLING ACCESS

The present application is a continuation of U.S. patent application Ser. No. 15/008,237, filed Jan. 27, 2016, entitled, "REMOTE APPLICATION FOR CONTROLLING ACCESS", which is hereby incorporated by reference.

TECHNICAL FIELD

The present disclosure relates generally to access control systems, and more particularly to access control systems used to provide access to secured areas.

BACKGROUND

It is often desirable to secure and control access to certain secure areas. Typically, access control systems are located at access points which lead to the secured areas, and are configured to grant or deny access to each individual attempting to gain access to the secured areas. In some cases, an access control system may include an access device (e.g., one or more of an electronic card reader, a keypad, a biometric identification system, and other access devices) that is configured to accept identifying information from an individual attempting to gain access to a secured area. If it is determined that the individual has access rights to the secured area, the access control system may log the entry event and unlock a door or the like to provide the individual with access to the secured area.

For some secure areas, an access control system may use dual authentication for granting access to a secured area. Access control systems requiring dual authentication may operate in an escort control mode and may require personnel wanting to gain access to a secured area to be accompanied by a supervisor. A supervisor may be considered anyone that has been given the authority to grant access to the requester to gain access to the secured area. In such an example, an access control system may include an access device at a door to a secured area and the personnel along with a supervisor may each be required to enter user identifiable information into the access device(s) in order to gain access to the secured area. When an access control system is operating in an escort mode and requires dual authentication, personnel will not be able to gain access to a secured area if the supervisor or an assigned approval personnel is not available or cannot be immediately located (e.g., in a meeting, out of the office, or otherwise unavailable). This can be disruptive, particularly if urgent work needs to be performed in the secured area.

SUMMARY

The present disclosure relates generally to access control systems, and more particularly to a dual authentication access control system for controlling access to a secured area. In one example, a supervisor is allowed to approve access requests by a person wanting to gain access to the secured area from a remote location. In some cases, the person requesting access to the secured area enters his credentials and submits an access request. If the person's credentials are verified, an access approval request is forwarded to a mobile device of a supervisor. If the supervisor elects to approve access, the supervisor enters his credentials via the supervisor's mobile device. If the supervisor's credentials are verified, the person is granted access to the secured area.

An illustrative access control system may include a server having a processor and a memory. In some cases, the memory may include a requester database and a supervisor database. The server may receive a request for access to a secured area from a first device associated with a first user listed in the requester database and receive from a second device associated with a second user listed in the supervisor database an approval for granting access to the secured area in response to the request for access. Once the server receives approval from the second device, the server may send an instruction to provide access to the secured area. In some cases, the first and/or second devices may be wireless devices, such as smartphones.

In some cases, a wireless device may be programmed to: detect a proximity to a door of a secured area, open a user interface screen of the wireless device, sometimes in response to detecting the proximity to the door of the secured area, receive user identifiable information from a user of the wireless device, and send a request for access to the secured area from the wireless device to a server having a user database. The request for access to the secured area may include the received user identifiable information.

An illustrative method may include receiving at a server a request for access to a secured area from a first device, where the request may be sent by a user of the first device. In response, the server may send to a second device a request for approval of the request for access to the secured area. The second device may be a supervisor's device. The method may further include receiving at the server from the second device a response to the request for approval of the request for access to the secured area. If the request for approval is approved by the supervisor, sending from the server a signal to provide access to the secured area.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which.

Figure 1:
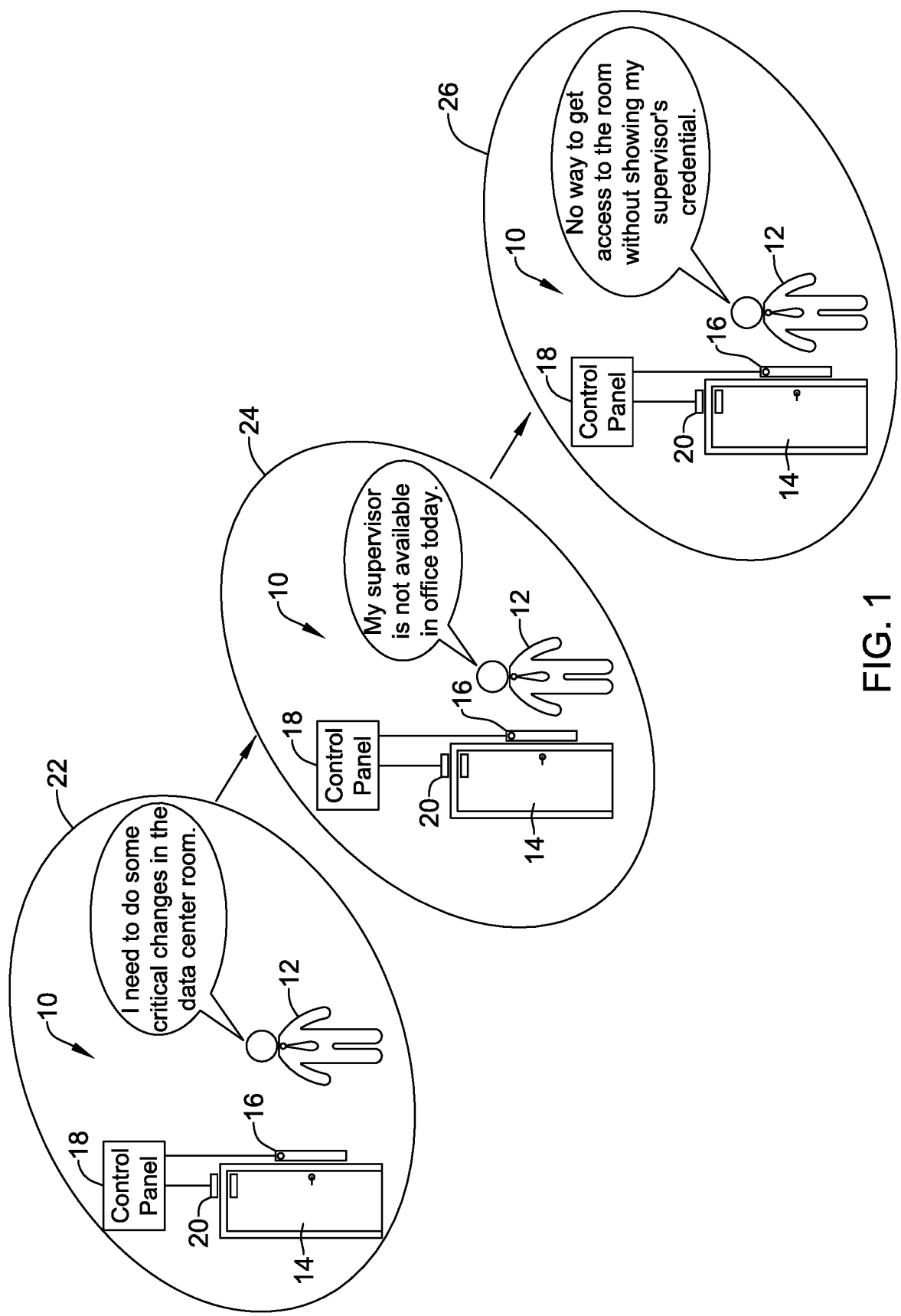
FIG. 1 is a schematic flow diagram of an illustrative user interacting with an access control system to gain access to a secure area through a door.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several illustrative embodiments which are meant to be illustrative in nature.

Areas, including buildings or rooms in buildings, or areas outside of buildings, may be secured by restricting access to those areas. Access control systems may be utilized at entry points for providing access to approved personnel.

Access controls systems may include one or more types of personnel authentication to help ensure access to a secured area is only granted to the personnel for which access is authorized. One example access control system may use dual authentication for granting access to a secured area. Access control systems requiring dual authentication may operate in an escort control mode and may require personnel wanting to gain access to a secured area to be accompanied by a supervisor. A supervisor may be considered anyone that has been given the authority to grant access to the requester to gain access to the secured area. In such an example, an access control system may include an access device (e.g., one or more of an electronic card reader, a keypad, a biometric identification system, and other access devices) at a door to a secured room and the personnel along with a supervisor may each be required to enter user identifiable information into the access device(s) in order to gain access to the secured area.

Secured areas may be any area for which access is to be restricted. Examples of secured areas may include, but are not limited to, server rooms, data centers, pharmaceutical rooms, laboratories, areas containing sensitive information, outdoor areas, and/or other areas. Further, secured areas may have different security levels, each having different requirements for gaining access. For example, a secured area may require submission of one or more of the following pieces of user identifiable information before access may be granted to the secured area: an identification card scan, a password, a personal identification number, a fingerprint scan, a retina scan, a facial recognition scan, and/or other identifiable information. In some cases, such as in a system requiring dual authentication, an access control system may require submission of user identifiable information from each of two (or more) people present at the secured area before granting access to the secured area.

In some cases, a process for gaining access to a secured area requiring dual authentication may include an employee (e.g., the personnel wanting to gain access to the secured area) presenting credentials (e.g., user identifiable information including, but not limited to, one or more of an electronically identifiable card, electronically identifiable phone, a personal identification number (PIN), a password, biometric information (e.g., finger print, facial recognition, retina scan), and other user identifiable information) to the access device. The access device may provide an indication (e.g., provide a light, such as a red LED light or other light, or instructions) for a period of time (e.g., 1 second, 2 seconds, 5 seconds, 10 seconds, 20 seconds, or other period of time) to indicate that it is ready to accept a supervisor's credentials. When the supervisor's credentials have been received within the period of time after the employee's credentials are provided, access may be granted to the secured area (e.g., a door may unlock and/or open a door or gate to a secured room, building, or other area). If the period of time expires prior to the access device receiving the supervisor's credentials, the access device may provide an indication that the process for accessing the secured area needs be repeated, provide an indication the supervisor's credentials were not received, or provide no indication at all.

When an access control system is operating in an escort mode and requiring dual authentication, if the supervisor or an assigned approval personnel is not available (e.g., in a meeting, out of the office, or otherwise unavailable), then the personnel wanting to gain access to the secured area will not be able to gain entry to the secured area. FIG. 1 depicts an example flow of a first level personnel 12 (e.g., a first level user or employee) attempting to access a secured area through a door 14 through which access may be restricted by an access control system 10, where the access control system may be operating in an escort mode. The access control system 10 may include an access device 16, a control panel 18, a lock 20, and/or other features.

Access devices 16 may include an electronic device or other device configured to facilitate controlling access to a secured area. Access devices 16 may include, but are not limited to, a camera (e.g., a video and/or still camera), a Bluetooth transceiver and/or transponder, a Bluetooth Low Energy (BLE) transceiver and/or transponder, a Radio Frequency Identification (RFID) transceiver and/or transponder, a Near-Field Communications transceiver and/or transponder, a fingerprint scanner, a facial recognition scanner, a retina scanner, a temperature scanner, and/or other suitable access devices.

At step 22 in FIG. 1, a first level personnel 12 may identify that access through the door 14 is desired (e.g., because the first level personnel needs to do some critical changes on data center machines in a data center room on the other side of the door 14 or for other purposes). However, when the first level personnel 12 approaches the door 14 at step 24, the first level personnel 12 may realize access through the door 14 is controlled by an access control system 10 that requires dual authentication and operates in an escort mode, and an assigned second-level personnel (e.g., a supervisor or other second level personnel) is out of the office and cannot provide credentials to the access device 16. As shown at step 26 of FIG. 1, the first level personnel is unable to access the secured room through the door 14 because the access control system 10 is operating in an escort mode and the access control system 10 will not allow the first level personnel 12 to enter through the door 14 without supplying a second level personnel's credentials to the access device 16. In such cases, it may be highly problematic if the first level personnel 12 is unable to gain access to the secured room at times that it is critical for the first level personnel 12 to access the secured room (e.g., to enter the data center room to make urgent changes on data center machines).

Figure 2:
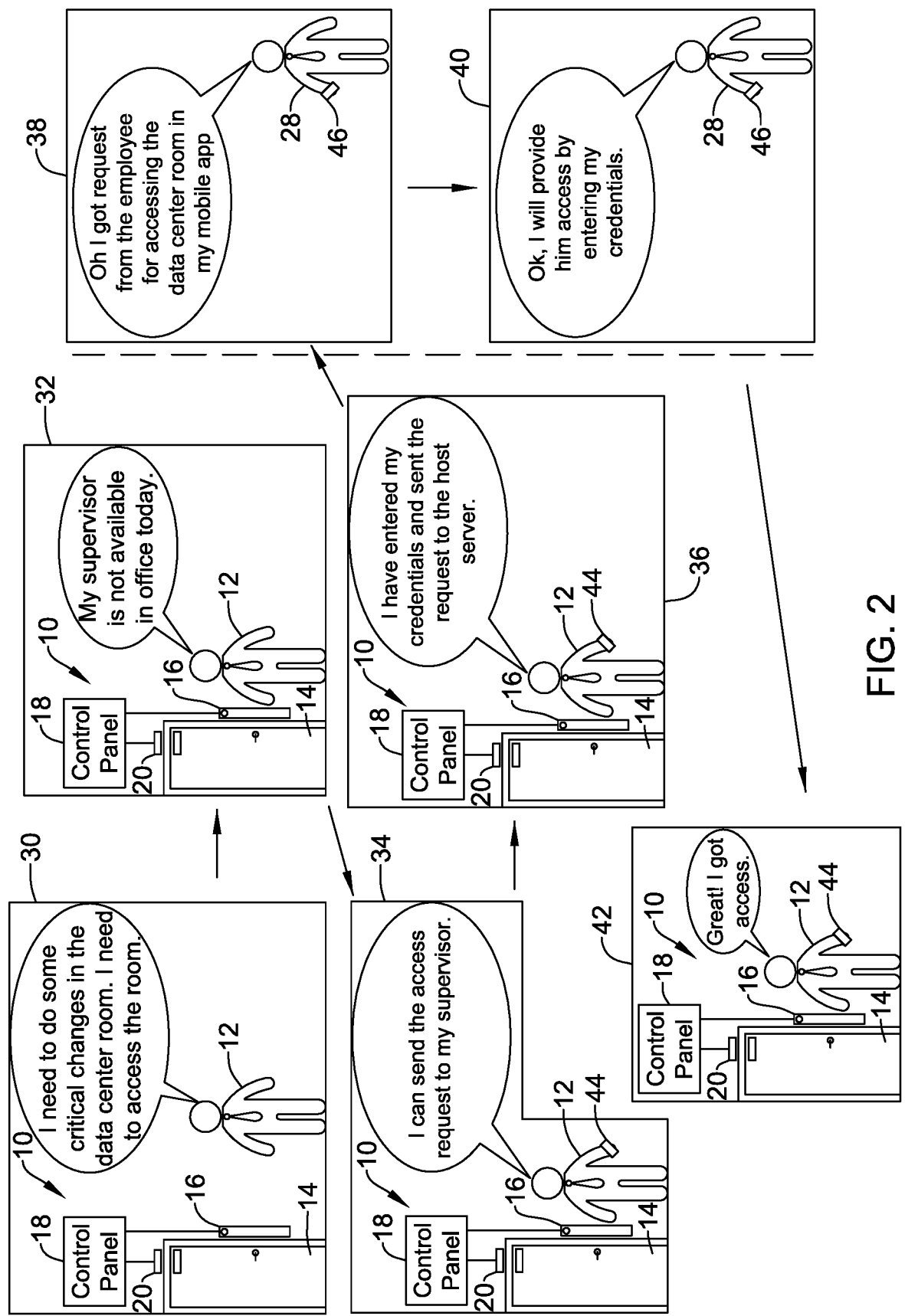
FIG. 2 is a schematic flow diagram of an illustrative user interacting with an access control system to gain access through a door.

FIG. 2 depicts another example of an access control system 10 utilizing dual authentication. However, in the example of FIG. 2, a second level personnel may be located remotely from the first level personnel and/or the door 14 through which the first level personnel would like to gain access. In this example, the access control system 10 may include an access device 16 (optional), a control panel 18, a lock 20, a mobile application accessible from mobile devices (e.g., a wireless device), a remote server in communication with the mobile devices and the control panel 18, and/or one or more other devices or systems. The access device 16, the control panel 18, and/or the lock 20 may be electronic devices.

At step 30 of FIG. 2, a first level personnel 12 may identify that access through the door 14 is desired (e.g., because the first level personnel needs to do some critical changes on data center machines in the data center room on the other side of the door 14 or for other purposes). However, when the first level personnel approaches the door 14 at step 32, the first level personnel 12 may realize that access through the door 14 is controlled by an access control system 10 that requires dual authentication and an assigned second level personnel 28 (e.g., a supervisor or other second level personnel) is out of the office. At step 34, the first level personnel 12 identifies that it can send a request for approve to gain entry through the door 14. In some cases, the first level personnel 12 may be able to enter and/or send its credentials using a first device (e.g., the access device 16 or a mobile device 44). Although the device of the first level personnel may be described herein as a mobile device 44 or other wireless device, it is contemplated that the first level personnel 12 may execute a process of requesting approval for access using access device 16 adjacent the secured area, rather than mobile device 44.

In step 36, the first level personnel 12 may enter its credentials at the first device and send an access request to the remote server. The remote server may verify the credentials of the first level personnel 12, and if verified, send a request for approval to a second device (e.g., a mobile device 46) held by the second level personnel 28, as shown at step 38. In response, and in step 40, the second level personnel 28 may enter its credentials in the second device (e.g., a mobile device 46) to approve the access request and send a response to the remote server approving access through the door 14 for the first level personnel 12. The remote server may then verify the credentials of the second level personnel 28, and if verified, send a command to the control panel 18 to unlock the lock 20 of the door 14. The first level personnel 12 may then gain access to the secured room via the unlocked door 14.

Figure 3:
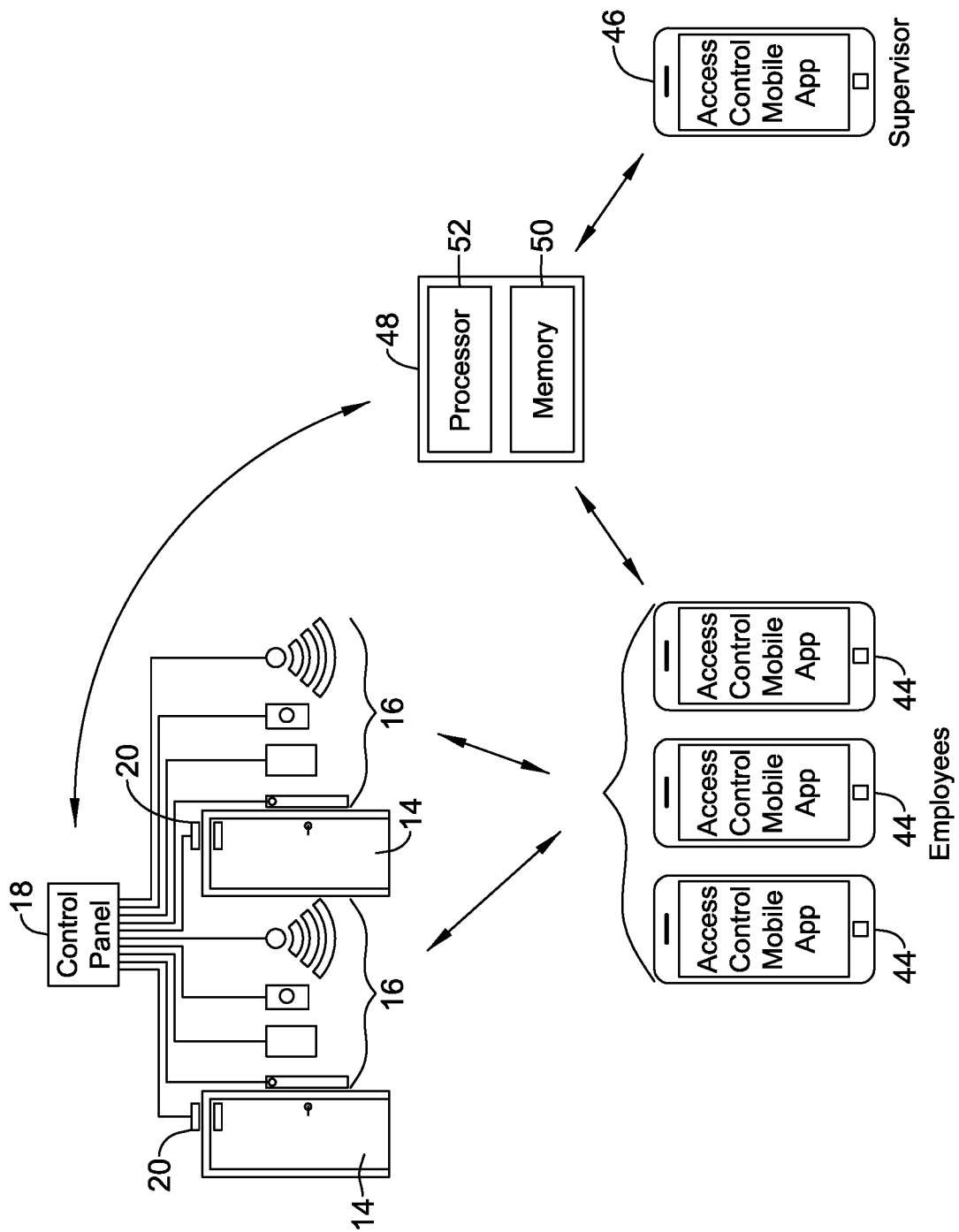
FIG. 3 is a schematic view of an illustrative access control system.

FIG. 3 is a schematic view of another illustrative access control system. In FIG. 3, the access control system 10 may include a server 48, access devices 16 including one or more sub-devices, an application program code executable by a processor of an access device 16 and/or one or more other devices (e.g., a first mobile device 44 and a second mobile device 46), locks 20, and a control panel 18. Mobile devices (e.g., wireless devices) may be any type of computing device that may be locally powered (e.g., battery powered) and capable of wireless communication (e.g., a mobile phone, a tablet computer, a laptop computer, etc.).

The server 48 may be located at or remotely from one or more of the control panel 18, the first mobile device 44, and the second mobile device 46. The server 48 may be located in the same building or facility as a secured area and/or may be located off-site. The control panel 18 may communicate with the server 48 in a wired or wireless manner. The first mobile device 44 and the second mobile device 46 may communicate with the server 48 at least in part over a wireless network.

The server 48 may include a memory 50 and a processor 52 in communication with the memory 50. The memory may store a first database and a second database, where the first database may be one of a requester database and a supervisor database, and the second database may be the other of the requester database and the supervisor database. Although the requester database and the supervisor database may be separately called out, it should be realized that the requester database and the supervisor database may be part of one or more larger databases or may together be a single database. That is, when the requester database and the supervisor database are separately called out herein, this does not mean that the requester database and the supervisor database are necessarily separate databases, and in many cases may be implemented as a single database.

The application program code (or app) running on the mobile devices 44, 46 (e.g., a phone, table computer, laptop computer, etc.) may be the same or different application program codes, and may be downloaded from an external Web service. In some cases, the application program code may be downloaded from Apple Inc.'s ITUNES™ or Google Play. Alternatively, or in addition, the application program code may be available for download from a web service that is provided to support the access control system 10 or supplies the access control system 10.

The application program code (or app) may be stored in memory of a user's mobile device 44, 46 and may contain a set of instructions for execution by a processor related to controlling access to a secured area. The user's mobile device 44, 46 may be any type of the mobile device described herein or otherwise known to be a mobile device. In some cases, the application program code may be stored in the memory of a user's phone or tablet computer for execution by the phone or tablet computer's processor to carry out various functions to facilitate receiving and/or providing access to a secured area.

The application program code may utilize a communication protocol that allows the application program code to be executed by multiple platforms (e.g., web, phone/tablet application, etc.). For example, a laptop computer and a phone/tablet may utilize the same installation setup logic by executing the same code from the same code base. In some cases, the application program code may be programmed to determine how to display each feature of a secured area access process to a user via the device's user interface. The application program code executed by a user's mobile device (e.g., phone, tablet, etc.) may connect to the server 48 directly or indirectly.

Figure 4:
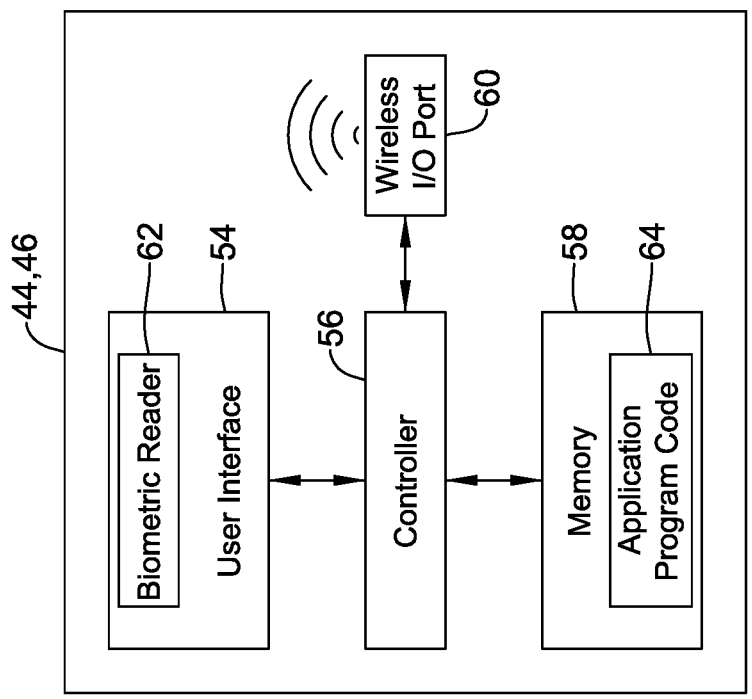
FIG. 4 is a schematic block diagram of an illustrative wireless device.

Turning to FIG. 4, the mobile devices (e.g., mobile devices 44, 46) of FIG. 3 may include a user interface 54, a controller 56 (e.g., a microprocessor, microcontroller, etc.) in two-way communication with the user interface 54, memory 58 connected to the controller 56, and one or more wireless input/output ports 60 in two-way communication with the controller 56. In some instances and as discussed, the mobile devices 44, 46 may be a phone (e.g., a smartphone) or a tablet computer, but this is not required.

As discussed above with reference to FIG. 3, the mobile devices 44, 46 may be used to communicate with one or more of the access devices 16 and/or the server 48 of the access control system 10. The mobile devices 44, 46 may be programmed to communicate over one or more wireless networks. Communication and data may be transmitted between mobile devices 44, 46 and one or more of the access devices 16 and the server 48 via the one or more wireless networks. The wireless input/output port(s) 60 of the mobile devices 44, 46 may facilitate wireless communication (e.g., sending and/or receiving data) with other devices (e.g., other mobile devices, the access devices 16, the server 48, etc.) through any suitable connection including, but not limited to, cellular communication, ZigBee, REDLINK™, Bluetooth, Bluetooth Low Energy (BLE), WiFi, IrDA, dedicated short range communication (DSRC), EnOcean, Near Field Communication (NFC), and/or any other suitable common or proprietary wireless protocol.

The user interface may be any type of user interface including an output (e.g., display, speakers, and/or other outputs) and/or an input (e.g., a keyboard, a touch screen, one or more buttons, biometric reader 62, and/or other inputs). In some cases, the user interface 54 may include one or more biometric readers 62. For example, an included biometric reader 62 may be a finger print sensor, a retina scanner, a facial recognition scanner, and/or other biometric reader 62.

The memory 58 may be any type of memory including, but not limited to, FLASH memory, Random Access Memory (RAM), Read Only Memory (ROM), and/or other memory types. In some instances, one or more application program codes (apps) 64 may be stored in the memory 58 for execution by the controller 56. The memory may be a computer readable medium capable of storing the application program codes 64 in a non-transitory state.

In some cases, the one or more application program codes 64 may be downloaded from an external web service such as, for example, Apple, Inc.'s ITUNES™, Google, Inc.'s Google Play, Honeywell's TOTAL CONNECT™ web service, a contractor's web site, and/or any other suitable location. In one instance, at least one of the application program codes 64 stored in the memory 58 may be related to controlling access to a secured room.

Figure 5:
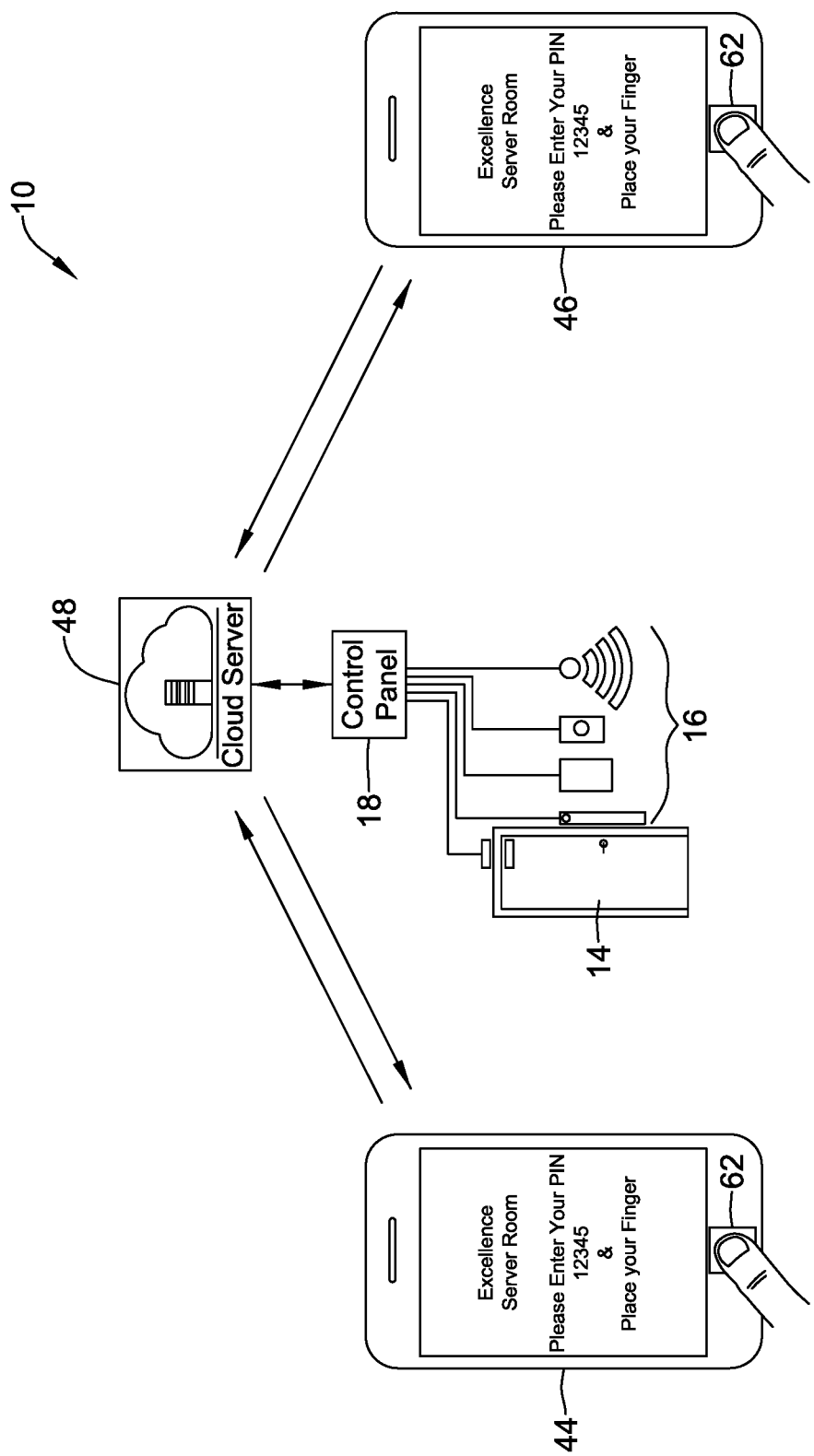
FIG. 5 is a schematic view of an illustrative access control system.

FIG. 5 depicts a device (e.g., a mobile device 44) of a first level personnel and a device (e.g., a mobile device 46) of a second level personnel 28 interacting with an access control system 10. The first level personnel 12 may wish to gain access to a secured area through the door 14. By interacting with an application program code of the access control system 10 on the device (e.g., mobile device 44), the first level personnel may enter its credentials into the device (e.g., the mobile device 44). In the example shown in FIG. 5, the first level personnel's credentials may include a PIN and a finger print scan, but additional and/or alternative biometric information and/or other authenticating information may be entered via the device (e.g., mobile device 44) or other device. As shown in FIG. 5, the biometric reader 62 may be a fingerprint reader, and once the first level personnel's fingerprint has been received, the application program code may send a request to the server 48 via the wireless input/output port 60 (or other communication port) for receiving access through the door 14. In some cases, the request may include the first level personnel's credentials.

In some cases, the first level personnel 12 may not have a mobile device 44. In this example, the first level personnel may enter its credentials into the access control device 16. Once received, the access control device 16 may send a request to the server 48 for receiving access through the door 14, sometimes via the control panel 18.

The server 48 may authenticate the first level personnel and if authenticated, send the request to a device (e.g., mobile device 46) of an appropriate second level personnel. If the second level personnel approves of the access request, the second level personnel may enter its credentials into the device by interacting with an application program code of the access control system 10 on a device (e.g., the mobile device 46). In the example shown in FIG. 5, the second level personnel's credentials may include a PIN and a finger print scan, but additional and/or alternative biometric information and/or other authenticating information may be entered via the device (e.g., the mobile device 46). Similar to as on the device of the first level personnel, the biometric reader 62 on the device of the second level personnel in FIG. 5 is a fingerprint reader. Once the second level personnel's PIN and fingerprint has been received, the application program code may send an approval of the request to the server 48 via the wireless input/output port 60 (or other communication port) for approving access through the door 14. In some cases, the approval may include the second level personnel's credentials.

The server 48 may authenticate the second level personnel and if authenticated, send a signal to the control panel 18 to provide access through the door 14 to the secured area for the first level personnel. In some cases, the signal from the server 48 may trigger the control panel to unlock the lock 20, to open the door 14, and/or otherwise allow access to the secured area.

Figure 6:
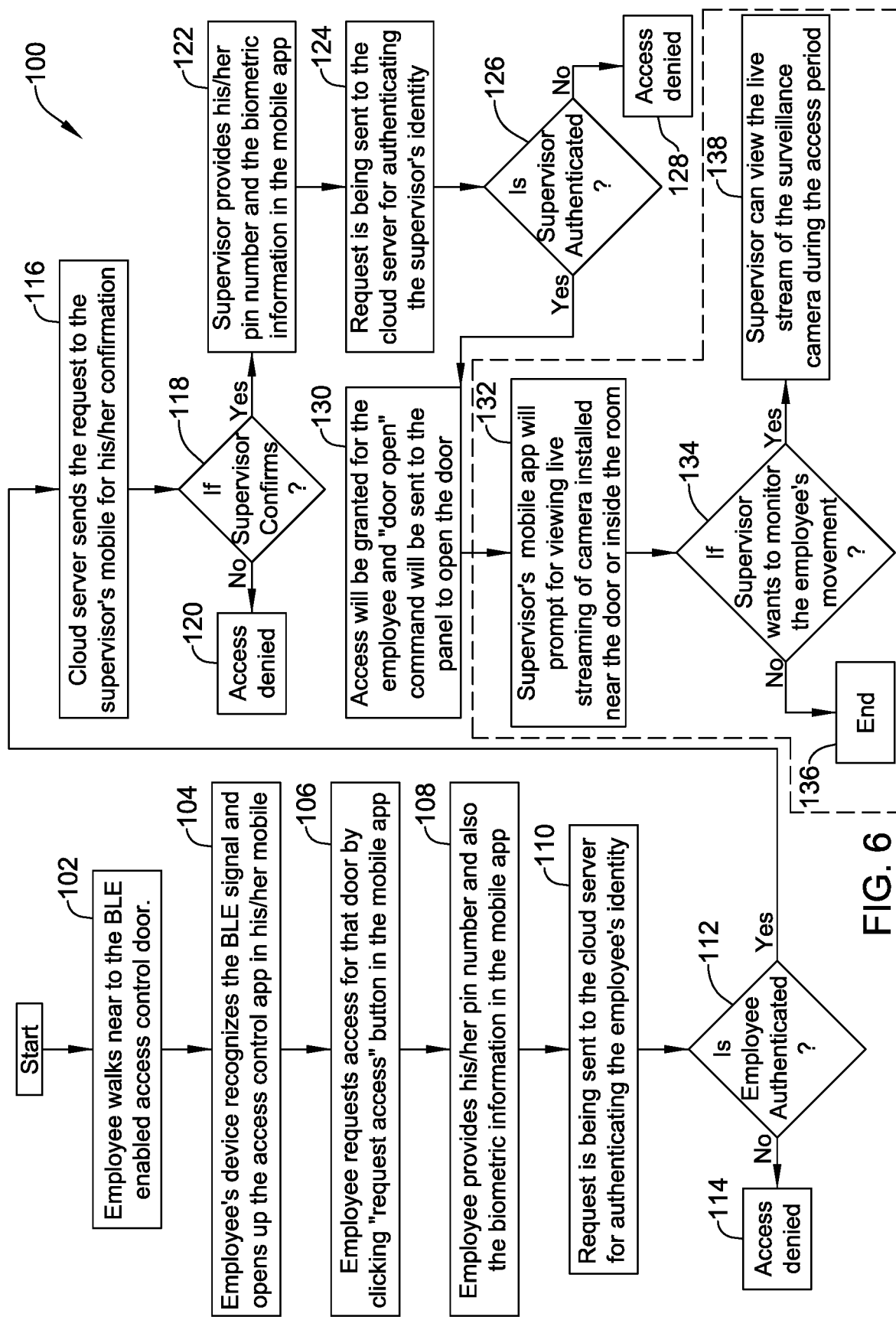
FIG. 6 is a schematic flow diagram of an illustrative method of interacting with an access control system.

FIG. 6 is a flow of an illustrative method 100 of interacting with the access control system 10 to gain access to a secured area, which is explained in the context of an employee (e.g., a first level personnel and/or a user of a first device) and a supervisor (e.g., a second level personnel and/or a user of a second device). In the description below, reference numerals for steps of the illustrative method 100 are either preceded by the term "step" or are within parentheses.

In the illustrative method 100, an employee may approach a door (e.g., door 14 or other door) securing access to a secured area with the access control system 10 (102). In some cases, as the employee approaches the door, the employee's device (e.g., a first device, such as the mobile device 44 or other device) may recognize its location relative to the door and automatically open an access control app (e.g., the application program code 64 executed by the controller 56 to provide a user interface screen) in the employee's device (104). In some cases, an access device 16 at the door and employee's device may be BLUETOOTH LOW ENERGY (BLE) enabled, and the employee's device may detect its location relative to the door by sensing the BLE enabled access device 16. Alternatively, or in addition, the employee's device may detect a Global Positioning System (GPS) identified position, sense a Radio Frequency Identification (RFID) tag at the door, a Near-Field Communication (NFC) signal, and/or one or more other location indicating signals to determine a location relative to the door.

In some cases, the employee may need to manually open the application program code. In some cases, the application program code may only be opened or openable when the employee's device detects a proximity to the secured area. Such a feature may be provided for added security of the secured area and/or for other reasons associated with avoiding in advertently providing access to the secured area.

At step 106, the employee may begin an access request process by selecting a button on a screen of the application program code operating on its device. Once the access request process has been initiated, the application program code may display a screen with a request on the employee's device for the employee to provide identification information (e.g., employee or user identifiable information). In one example, the requested identification information may include at least one password or PIN and at least one piece of biometric information. Other information may be requested as desired. The employee may enter its password or PIN and its biometric information (108) and the request for access to the secured area may be sent to and received at a server of the access control system 10 for authentication and further processing (110). The request for access may be sent from the employee's device automatically upon the submission of the identification information or after submission of the identification information and after the employee selects a button on a screen of the application program code.

In some cases, the request for access may include a confirmation that the employee and/or the employee's device is within a certain proximity of the door providing access to the secured area. The confirmation that the employee and/or the employee's device is within the certain proximity may be, but is not limited to, one or more of a signal indicating the phone is sensing an access device 16 adjacent the secured area at the time a request is sent, a picture from a camera adjacent the secured area, a video from a camera adjacent the secured area, and/or one or more other indications.

At step 112, the server may authenticate the employee's provided identification information. In one example, as referred to above, the server may include a requester database that includes a list of employees that are authorized for access to a secured area if approved by a supervisor, where the list may include identification information for each listed employee. In the example, to authenticate the employee, the server may be configured (e.g., programmed) to compare (e.g., match) the identification information in the request from the employee's mobile device to the identification information in the requester database. If the identification information in the request does not match identification information in the requester database, the server may send a signal to the employee's device via the application program code on the device indicating that access has been denied (114). In some cases, the application program code on the employee's device may display a screen indicating why access was denied (e.g., identification information in the request did not match identification information in the requester database), but this is not required. Additionally, or alternatively, the application program code on the employee's device may display a screen asking the employee to try submitting its request with identification information again in response to the denied access signal from the server.

If the server is able to authenticate the employee's provided identification information (e.g., the employee's identity) at step 112, the server may send the employee's secured area access request to and the request may be received at a supervisor's device (e.g., a second device such as mobile device 46) for approval or denial of the request (116), where the supervisor is listed in the requester database as being approved for reviewing secured area access requests from that employee and/or is approved for reviewing secured area access requests for the requested secured area. In response to receiving an employee secured area access request from the server, the supervisor's device may open an application program code screen on the device and the application program code may display a screen asking the supervisor to approve or deny the request (118). If the supervisor selects a deny button on the screen provided by the application program code, the request will be denied (120) and the supervisor's device may send a signal to the server indicating the secured area access request has been denied. The server may then relay the denial of the request to the employee's device. The relay of the denial may or may not indicate why the request was denied (e.g., because the supervisor denied the request).

As an alternative to selecting a deny button on a screen provided by the application program code, the supervisor may not answer the employee's request and after a period of time without a response from the supervisor's device, the server may be configured to relay a signal to the employee's device that its secured area access request has been denied. Such a signal may or may not indicate why the request was denied (e.g., because the request was not answered by the supervisor).

In some cases, when an employee's secured area access request is not answered by a supervisor, the server may be configured to try sending the request to a different supervisor associated with the employee and/or the requested secured area. The server may be configured to send the request to a different supervisor automatically upon receiving a denial of access due to a request not being answered or in response to a request to do so from the employee's device.

If the supervisor approves of the secured area access request, the supervisor may begin a request approval process by selecting a button on a screen displayed by the application program code on its device or through other input. Once the request approval process has been initiated, the application program code may display a screen requesting the supervisor provide identification information (e.g., supervisor or user identifiable information) via the supervisor's device. In one example, the requested identification information may include at least one password or PIN and at least one piece of biometric information. Other information may be requested as desired. The supervisor may enter its password or PIN and its biometric information (122) and the approval of the request for access to the secured area may be sent to and received at a server of the access control system 10 for authentication and further processing (124).

At step 126, the server may authenticate the supervisor's provided identification information. In one example, as referred to above, the server may include a supervisor database that includes a list of supervisors and associated employees that are authorized for approving access to a secured area for the associated employees, where the list may include identification information for each listed supervisor. In the example, to authenticate the supervisor, the server may be configured to compare (e.g., match) the identification information in the approval from the supervisor's device to the identification information in the supervisor database. If the identification information in the approval does not match the identification information in the supervisor database, the server may send a signal to and the signal may be received at the employee's device via the application program code on the device indicating access has been denied (128) and, optionally, the server may send a signal to and the signal may be received at the supervisor's device via the application program code on the device indicating that authentication could not be confirmed. In some cases, a screen provided by the application program code on the employee's device may indicate why access was denied (e.g., because identification information in an approval did not match identification information in the supervisor database), but this is not required. Additionally, or alternatively, the application program code on the employee's device may display a screen asking the employee to try submitting its request with identification information again in response to the denied access signal from the server. Similarly, the application program code on the supervisor's device may display a screen asking the supervisor to try submitting an approval again in response to the denied authentication of the supervisor's identification information.

If the server is able to authenticate the supervisor's provided identification information (e.g., the supervisor's identity) at step 126, the server may send a signal (e.g., a "door open" command) to and the signal may be received at a control panel of the access control system to allow access to the secured area through the door (130). The access devices at or adjacent the secured area may be configured to provide an indication (e.g., visual, audio, and/or sensual indication) that the employee may access the secured area. Optionally, the server may send a signal indicating the supervisor's approval of the employee's secured area access request to and the signal may be received at one or more of the employee's device and the supervisor's device.

In some cases after step 130, a process of securing access to the secured area may be complete. Alternatively, and optionally (as indicated by surrounding steps 132-138 in a dotted box), after the supervisor approves a secured area access request, the server may send a signal to the supervisor's device from the control panel of the access control system 10 that includes a video feed or an invitation to view a video feed form one or more cameras (e.g., surveillance cameras) located adjacent the door of a secured area (e.g., inside or outside of the secured area) and/or at other locations around and/or within the secured area. The signal from the control panel may cause the application program code on the supervisor's device to automatically display a screen with the video feed or may cause the application program code to display a screen prompting the user to display the video feed (132) or deny playing the video feed. At step 134, the supervisor may choose whether to view the video feed or end the process of securing access to the secured area. If the supervisor chooses to view the video feed, the supervisor may be able to view video from the cameras while the employee is in the secured area (138) by accepting the video feed on a screen displayed on its device, selecting a button on a screen displayed by the application program code, by not closing the screen displayed by the application program code, and/or by taking one or more other actions or by doing nothing. If the supervisor chooses not to view the video feed or decides to end the video feed, the supervisor may end the process of securing access to the secured area (136) by selecting a button on a screen displayed by the application program code, by closing a screen displayed by the application program code, and/or by taking one or more other actions or by doing nothing.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A method for obtaining access to a secured room comprising:
   determining when a wireless device of a user is in proximity to a door of the secured room;
   when it is determined that the wireless device of the user is in proximity to the door of the secured room, receiving at the wireless device of the user, user identifiable information from the user to uniquely identify the user, wherein the user identifiable information includes biometric information captured by the wireless device of the user that identifies one or more biometric characteristics unique to the user;
   authenticating that the user has access rights to the secured room based at least in part on the one or more biometric characteristics unique to the user;
   when the user has been authenticated, sending an approval request to a wireless device of a supervisor to obtain approval for the request to access the secured room; and
   sending a signal to an access control device to unlock the door of the secured room when the approval request is approved by the supervisor, and not sending the signal to the access control device to open the door when the approval request is not approved by the supervisor.

2. The method of claim 1, wherein after the wireless device of the supervisor receives the approval request:
   receiving at the wireless device of the supervisor user identifiable information from the supervisor to uniquely identify the supervisor, wherein the user identifiable information includes biometric information captured by the wireless device of the supervisor that identifies one or more biometric characteristics unique to the supervisor;
   authenticating the supervisor based at least in part on the one or more biometric characteristics unique to the supervisor; and
   when the supervisor has been authenticated, allowing the supervisor to approve the approval request.

3. The method of claim 1, further comprising:
   after approving the approval request, displaying a video stream from a surveillance camera situated in the secured room on a display of the wireless device of the supervisor.

4. The method of claim 1, wherein when the supervisor does not respond to the approval request, sending a subsequent approval request to a wireless device of another supervisor to obtain approval for the request to access to the secured room.

5. The method of claim 1, wherein authenticating that the user has access rights to the secured room is performed at least in part by a server.

6. The method of claim 1, wherein authenticating that the user has access rights to the secured room is performed at least in part by the wireless device of the user.

* * * * *